United States Patent [19]

Etling et al.

[11] 3,793,590

[45] Feb. 19, 1974

[54] WINDOW MOUNTED VEHICULAR RADIO ANTENNA

[75] Inventors: Lyle R. Etling, Wabash; Jerry M. Mason; John W. Weber, both of Kokomo, all of Ind.

[73] Assignee: General Motors Corporation, Detroit, Mich.

[22] Filed: Sept. 1, 1972

[21] Appl. No.: 285,898

[52] U.S. Cl. .................. 325/312, 174/68.5, 343/711
[51] Int. Cl. .............................................. H01q 1/32
[58] Field of Search ... 174/68.5; 325/312, 315, 365; 343/711, 712

[56] References Cited

UNITED STATES PATENTS

| | | | |
|---|---|---|---|
| 3,549,785 | 12/1970 | Timko, Jr. | 343/712 X |
| 3,484,584 | 12/1969 | Shaw, Jr. | 343/711 |

*Primary Examiner*—Benedict V. Safourek
*Attorney, Agent, or Firm*—T. G. Jagodzinski

[57] ABSTRACT

An FM conductor and a pair of AM conductors are supported by a window mounted within an opening formed in a conductive body portion of a vehicle and defined by a major or generally horizontal axis and a minor or generally vertical axis. The FM conductor extends from a common terminal approximately coincident with the vertical axis of the opening relatively remote from the perimeter of the opening to minimize the capacitance between the FM conductor and the body portion. The FM conductor extends over an effective length approximately equal to one-quarter wavelength of the center frequency of the FM frequency band for maximizing the current developed at the common terminal in response to FM radio signals thereby to optimally receive such FM radio signals. The pair of AM conductors are symmetrically disposed with respect to the vertical axis of the opening. Specifically, the AM conductors extend from the common terminal approximately parallel to the horizontal axis of the opening relatively adjacent the perimeter of the opening thereby to minimize interference with vision through the window. The AM conductors each extend over an effective length approximately equal to one-half wavelength of the center frequency of the FM frequency band for maximizing the impedance developed at the common terminal in response to FM radio signals thereby to minimize interference with the reception of such FM radio signals by the FM conductor.

5 Claims, 4 Drawing Figures

PATENTED FEB 19 1974

3,793,590

WINDOW MOUNTED VEHICULAR RADIO ANTENNA

This invention relates to a window mounted antenna for a vehicular radio receiver. More particularly, the invention relates to an AM-FM radio antenna for a vehicle including a conductive body portion having a window opening enclosed within a perimeter generally defined by a major or horizontal axis and a minor or vertical axis.

According to one aspect of the invention, an FM conductor for receiving FM radio signals and an AM conductor for receiving AM radio signals are each supported within the opening by the window and are each connected at one end to a common terminal. The FM conductor extends over an effective length approximately equal to one-quarter wavelength of the frequencies in the FM frequency band for maximizing the current developed at the common terminal in response to FM radio signals thereby to optimally receive such FM radio signals. The AM conductor extends over an effective length approximately equal to one-half wavelength of the frequencies in the FM frequency band for maximizing the impedance developed at the common terminal in response to FM radio signals thereby to minimize interference with the reception of such FM radio signals by the FM conductor.

In another aspect of the invention, the common terminal is located at approximately an intersection of the minor or vertical axis of the opening and the perimeter of the opening. The FM conductor extends from the common terminal approximately coincident with the minor or vertical axis of the opening relatively remote from the perimeter of the opening to minimize the capacitance between the FM conductor and the body portion. The AM conductor extends from the common terminal approximately parallel to the major or horizontal axis of the opening relatively adjacent the perimeter of the opening to minimize interference with vision through the window.

As contemplated by another aspect of the invention, one or more pairs of AM conductors are supported by the window within the opening to increase the overall strength of the AM radio signals developed at the common terminal thereby to improve the reception of such AM radio signals. Moreover, each pair of AM conductors is symmetrically disposed with respect to the minor or vertical axis of the opening to enhance the decorative effect of the AM conductors.

These and other aspects and advantages of the invention will become more apparent by reference to the following detailed description of the preferred embodiments of the invention when considered in conjunction with the accompanying drawing.

Figure 1:
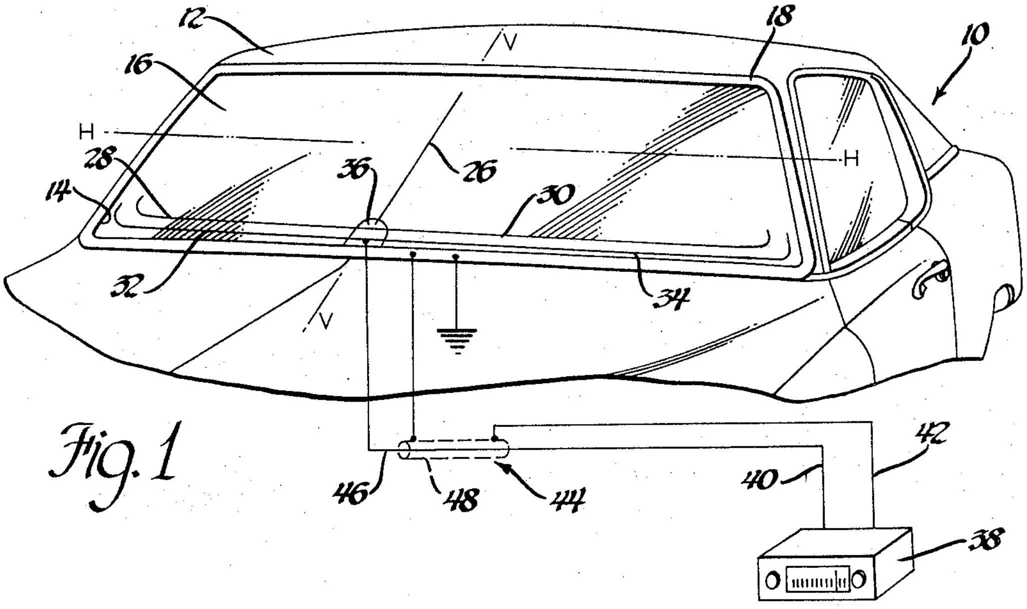
FIG. 1 is a perspective view of one preferred embodiment of a window mounted vehicular radio antenna incorporating the principles of the invention.
Figures 2, 3:
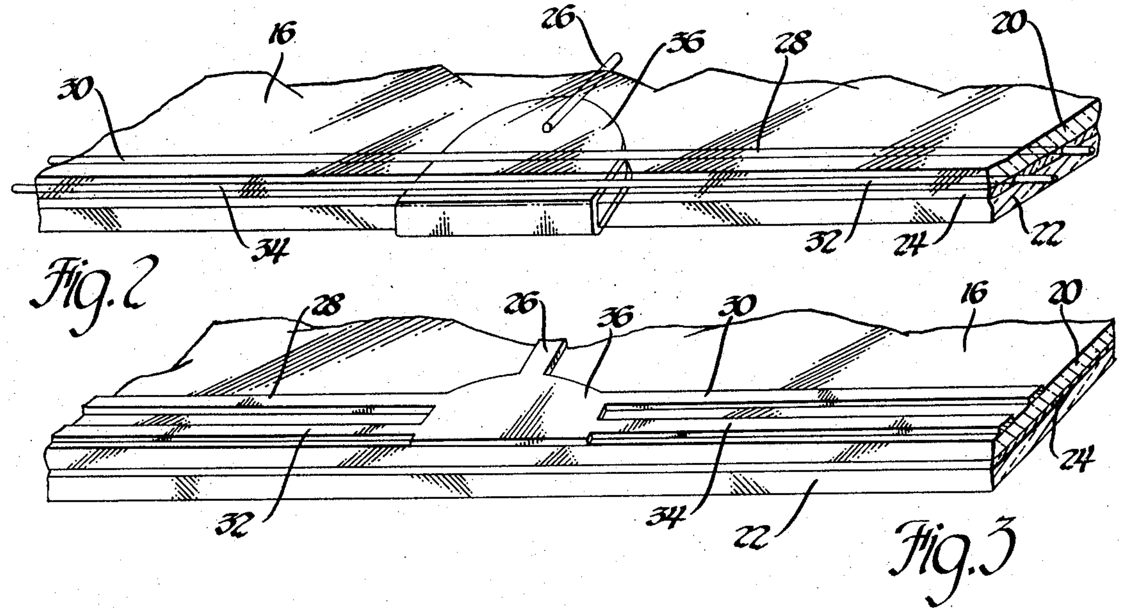
FIGS. 2 and 3 are enlarged views of alternate arrangements of the preferred embodiment illustrated in FIG. 1.

Referring to FIGS. 1, 2 and 3, an automotive vehicle 10 includes a metallic body portion 12 having a windshield aperture or opening 14. The opening 14 is enclosed within a perimeter generally defined by a major or horizontal axis H—H and a minor or vertical axis V—V. A windshield 16 is mounted within the opening 14 by a molding 18. Preferably, the windshield 16 includes interior and exterior glass panes 20 and 22 separated by an intermediate thermoplastic layer 24 as best shown in FIGS. 2 and 3.

An FM conductor 26 and a plurality of AM conductors 28, 30, 32 and 34 are supported within the opening 14 by the window 16. The conductors 26, 28, 30, 32 and 34 may be rod or wire conductors embedded within the intermediate layer 24 between the inner surface of the interior pane 20 and the inner surface of the exterior pane 22 as shown in FIG. 2. Alternately, the conductors 26, 28, 30, 32 and 34 may be strip or ribbon conductors formed by firing "frit," a ceramic-silver mixture, onto the outer surface of the interior pane 20 as shown in FIG. 3. In either event, the conductors 26, 28, 30, 32 and 34 are protected from degradation due to the natural elements and are protected from damage due to external striking objects. Further, it is to be understood that the conductors 26, 28, 30, 32 and 34 may also be mounted on the outer surface of the exterior pane 22.

Each of the conductors 26, 28, 30, 32 and 34 extends from a terminal end to an open end. The terminal ends of the conductors 26, 28, 30, 32 and 34 are each connected to a common terminal 36. The terminal 36 is supported within the opening 14 by the windshield 16 and is located at approximately the intersection of the minor or vertical axis V—V with the bottom perimeter of the opening 14.

Where the conductors 26, 28, 30, 32 and 34 are wire conductors, the common terminal 36 may be a piece of highly conductive metallic foil as shown in FIG. 2. The foil terminal 36 extends from the outer surface of the interior pane 20 around the bottom periphery to the inner surface of the interior pane 20. The terminal ends of the wire conductors 26, 28, 30, 32 and 34 may be electrically connected to the common terminal 36 by a soldered joint.

Where the conductors 26, 28, 30, 32 and 34 are "frit" conductors, the common terminal 36 may also be a piece of highly conductive metallic foil as shown in FIG. 2, or the common terminal 34 may itself be a deposit of "frit" as shown in FIG. 3. The "frit" terminal 34 is fired onto the outer surface of the interior pane 20 where it is integrally joined with the "frit" conductors 26, 28, 30, 32 and 34.

The conductors 26, 28, 30, 32 and 34 provide an antenna for a radio receiver 38 carried by the vehicle 10. In a manner which will be more fully explained later, the FM conductors 26 receives FM radio signals while the AM conductors 28, 30, 32 and 34 receive AM signals. Of course, the FM conductor 26 also receives AM radio signals to some extent. The FM signals received by the FM conductor 26 and the AM signals received by the FM conductor 26 and the AM conductors 28, 30, 32 and 34 are developed at the common terminal 36.

The radio receiver 38 is adapted to alternately process either AM radio signals or FM radio signals as applied between a pair of inputs 40 and 42. A coaxial cable 44 couples the received AM or FM radio signals from the common terminal 36 to the radio receiver 38. The coaxial cable 44 includes an inner conductor 46 and an outer conductor 48. The inner conductor 46 connects the input 40 to the common terminal 36 while the outer conductor 48 connects the input 42 to the body portion 12 of the vehicle 10 which serves as a ground for the radio receiver 32.

The FM conductor 26 extends approximately coincident with the minor or vertical axis V—V of the opening 14 relatively remote from the perimeter of the opening 14 to minimize the capacitance between the FM conductor 26 and the metallic body portion 12. Consequently, the capacitance between the FM conductor 26 and the metallic body portion 12 does not appreciably load down the FM conductor 26.

Further, the FM conductor 26 extends over an effective length approximately equal to one-quarter wavelength of a predetermined frequency in the FM frequency band. Preferably, the predetermined frequency is at or near the center frequency of the FM frequency band. As a result, the FM conductor 26 is quarter-wave resonant to FM radio signals thereby to maximize the current developed at the common terminal 36 in response to the reception of FM radio signals.

The AM conductors 28, 30, 32 and 34 each extend parallel to the major or horizontal axis H—H of the opening 14, over at least a portion of their length, relatively adjacent to the bottom perimeter of the opening 14 to minimize interference with vision through the windshield 16. Of course, the near proximity of the AM conductors 28, 30, 32 and 34 to the perimeter of the opening 14 gives rise to a considerable capacitance between the AM conductors 28, 30, 32 and 34 and the metallic body portion 12. However, due to the relatively low frequencies in the AM frequency band, this capacitance does not unduly load down the AM conductors 28, 30, 32 and 34.

In addition, the AM conductors 28, 30, 32 and 34 extend over an effective length approximately equal to one-half wavelength of the predetermined frequency in the FM frequency band. As a result, the AM conductors 28, 30, 32 and 34 are half-wave resonant to FM radio signals thereby to maximize the impedance developed at the common terminal 36 in response to the reception of FM radio signals. Accordingly, the capacitance between the AM conductors 28, 30, 32 and 34 and the metallic body portion 12 also does not unduly load down the FM conductor.

The AM conductors 28, 30, 32 and 34 are arranged in corresponding pairs 28–30 and 32–34 which are symmetrically disposed with respect to the minor or vertical axis of V—V of the opening 14 to enhance the decorative effect of the AM conductors 28, 30, 32 and 34. However, it is to be noted that more or less than two pairs of AM conductors 28–30 and 32–34 may be utilized as desired. In general, it has been found that the strength of the AM radio signals developed at the common terminal is directly related to the number of AM conductors 28, 30, 32 and 34. Hence, the strength of the AM radio signals developed at the common terminal 36 increases with an increase in the number of AM conductors 28, 30, 32 and 34. Or, put another way, the greater the area of the opening 14 covered by the AM conductors 28, 30, 32 and 34, the stronger the AM radio signals developed at the common terminal 36.

Figure 4:
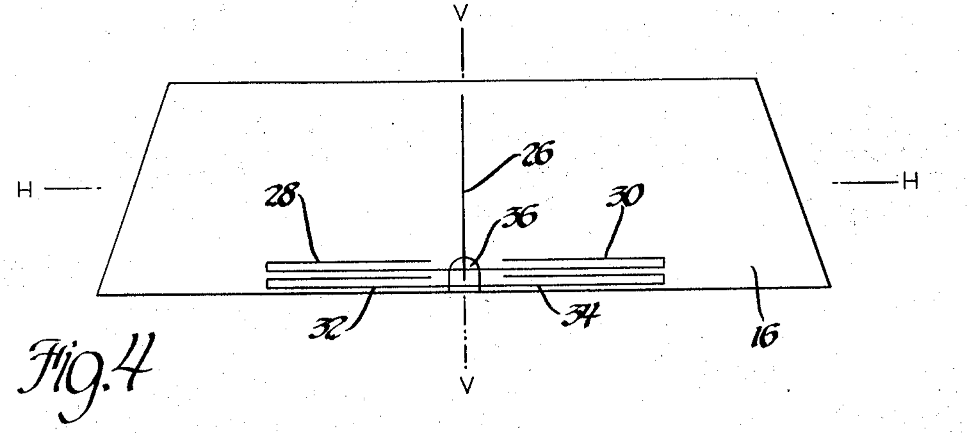
FIG. 4 is a schematic view of another preferred embodiment of a window mounted vehicular radio antenna incorporating the principles of the invention.

FIG. 4 illustrates another embodiment of the antenna shown in FIG. 1 and like numerals are used to denote like elements. The antenna illustrated in FIG. 4 is identical to the antenna illustrated in FIG. 1 except that the AM conductors 28, 30, 32 and 34 each comprise a pair of parallel spaced conductor sections which are serially connected to the common terminal 36. The conductor sections of the AM conductors 28, 30, 32 and 34 each have a length approximately equal to one-quarter wavelength of the predetermined frequency in the FM frequency band. Hence, the AM conductors 28, 30, 32 and 34 of the antenna illustrated in FIG. 4 are electrical equivalents of the AM conductors 28, 30, 32 and 34 of the antenna illustrated in FIG. 1.

It will now be apparent that the subject invention provides a simple but effective technique for substantially increasing the performance of a window mounted vehicular radio antenna. However, it is to be understood that the illustrated embodiments of the invention are shown for demonstrative purposes only, and that various alterations and modifications may be made to the illustrated embodiments without departing from the spirit and scope of the invention. For example, each of the antennas illustrated in FIGS. 1 and 4 could be turned upside down without appreciably affecting the operation of the antennas as previously described.

What is claimed is:

1. In a vehicle, the combination comprising: an AM-FM radio receiver; a body portion having a window opening; a window mounted within the opening; a common terminal supported within the opening by the window; and FM conductor supported within the opening by the window and connected at one end to the common terminal for providing an FM antenna, the FM conductor having an effective length approximately equal to one-quarter wavelength of the frequencies in the FM frequency band for developing a maximum current at the common terminal in response to FM radio signals thereby to optimally receive such FM radio signals; an AM conductor supported within the opening by the window and connected at one end to the common terminal for providing an AM antenna, the AM conductor having an effective length approximately equal to one-half wavelength of the frequencies in the FM frequency band for developing a maximum impedance at the common terminal in response to the presence of FM radio signals thereby to minimize interference with the reception of such FM radio signals by the FM conductor; and means for coupling the received AM and FM radio signals from the common terminal to the radio receiver.

2. An AM-FM antenna for a radio receiver carried by a vehicle including a conductive body portion having a window opening, comprising: a window generally conforming to the shape of the window opening for mounting within the opening; a common terminal supported by the window; an FM conductor supported by the window and connected at one end to the common terminal for providing an FM antenna, the FM conductor having an effective length approximately equal to one-quarter wavelength of the frequencies in the FM frequency band for developing a maximum current at the common terminal in response to FM radio signals thereby to optimally receive such FM radio signals; and an AM conductor supported by the window and connected at one end to the common terminal for providing an AM antenna, the AM conductor having an effective length approximately equal to one-half wavelength of the frequencies in the FM frequency band for developing a maximum impedance at the common terminal in response to the presence of FM radio signals thereby to minimize interference with the reception of such FM radio signals by the FM conductor.

3. In a vehicle, the combination comprising: an AM-FM radio receiver; a conductive body portion having a window opening enclosed within a perimeter generally defined by mutually perpendicular major and minor axes; a window mounted within the opening; a common terminal supported within the opening by the window and located at approximately an intersection of the minor axis of the opening and the perimeter of the opening; an FM conductor supported within the opening by the window and connected at one end to the common terminal for providing an FM antenna, the FM conductor extending approximately coicident with the minor axis of the opening relatively remote from the perimeter of the opening to minimize the capacitance between the FM conductor and the body portion, the FM conductor having an effective length approximately equal to one-quarter wavelength of the frequencies in the FM frequency band for maximizing the current developed at the common terminal in response to FM radio signals thereby to optimally receive such FM radio signals; a pair of AM conductors supported within the opening by the window and each connected at one end to the common terminal for providing an AM antenna, the pair of AM conductors extending in symmetrical fashion with respect to the minor axis approximately parallel to the major axis of the opening adjacent the perimeter of the opening to minimize interference with vision through the window, the AM conductors each having an effective length approximately equal to one-half wavelength of the frequencies in the FM frequency band for maximizing the impedance at the common terminal in response to FM radio signals thereby to minimize interference with the reception of such FM radio signals by the FM conductor; and means for coupling the received AM and FM radio signals from the common terminal to the radio receiver.

4. An AM-FM antenna for a radio receiver carried by a vehicle including a conductive body portion having a window opening enclosed within a perimeter defined by an approximately horizontal major axis and an approximately vertical minor axis, comprising: a window generally conforming to the shape of the window opening for mounting within the opening; a common terminal supported by the window and located at approximately an intersection of the vertical axis of the opening and the periphery of the opening when the window is mounted within the opening; an FM conductor supported by the window and connected at one end to the common terminal for providing an FM antenna, the FM conductor extending approximately coincident with the vertical axis of the opening remote from the perimeter of the opening when the window is mounted within the opening thereby to minimize the capacitance between the FM conductor and the body portion, the FM conductor having an effective length approximately equal to one-quarter wavelength of the center frequency of the FM frequency band for maximizing the current developed at the common terminal in response to FM radio signals thereby to optimally receive such FM radio signals; a plurality of pairs of AM conductors supported by the window and each connected at one end to the common terminal for providing an AM antenna, each pair of AM conductors extending in symmetrical fashion with respect to the vertical axis of the opening approximately parallel to the horizontal axis of the opening adjacent the perimeter of the opening when the window is mounted within the opening for minimizing interference with vision through the window, the AM conductors each having an effective length approximately equal to one-half wavelength of the center frequency of the FM frequency band for maximizing the impedance developed at the common terminal in response to FM radio signals thereby to minimize interference with the reception of such FM radio signals by the FM condcutor.

5. In a vehicle, the combination comprising: an AM-FM radio receiver; a conductive body portion having a window opening enclosed within a perimeter generally defined by mutually perpendicular major and minor axes; a window mounted within the opening; a common terminal supported within the opening by the window and located at approximately an intersection of the minor axis of the opening and the perimeter of the opening; an FM conductor supported within the opening by the window and connected at one end to the common terminal for providing an FM antenna, the FM conductor extending approximately coincident with the minor axis of the opening relatively remote from the perimeter of the opening to minimize the capacitance between the FM conductor and the body portion, the FM conductor having an effective length approximately equal to one-quarter wavelength of the frequencies in the FM frequency band for maximizing the current developed at the common terminal in response to FM radio signals thereby to optimally receive such FM radio signals; an AM conductor supported within the opening by the window and including a pair of parallel spaced conductor sections connected in series relationship to the common terminal, the AM conductor sections extending approximately parallel to the major axis of the opening adjacent the perimeter of the opening to minimize interference with vision through the window, the AM conductor sections each having an effective length approximately equal to one-quarter wavelength of the frequencies in the FM frequency band for maximizing the impedance at the common terminal in response to FM radio signals thereby to minimize interference with the reception of such FM radio signals by the FM conductor; and means for coupling the received AM and FM radio signals from the common terminal to the radio receiver.

* * * * *

PO-1050
(5/69)

UNITED STATES PATENT OFFICE
CERTIFICATE OF CORRECTION

Patent No. 3,793,590 Dated February 19, 1974

Inventor(s) Lyle R. Etling, et al

It is certified that error appears in the above-identified patent and that said Letters Patent are hereby corrected as shown below:

Column 5, line 14 "coicident" should read -- coincident -- Column 6, line 20 "condcutor" should read -- conductor --.

Signed and sealed this 13th day of August 1974.

(SEAL)
Attest:

McCOY M. GIBSON, JR.
Attesting Officer

C. MARSHALL DANN
Commissioner of Patents